(12) United States Patent
Georgetti Marcondes et al.

(10) Patent No.: US 11,826,671 B2
(45) Date of Patent: Nov. 28, 2023

(54) FUEL PRE-FILTER MODULE, FILTER ELEMENT AND FILTER HEAD WITH A PRIMING PUMP

(71) Applicant: MANN+HUMMEL GmbH, Ludwigsburg (DE)

(72) Inventors: Marcos Vicente Georgetti Marcondes, Sao Paulo (BR); Bruna de Carvalho Vessio, Sao Paulo (BR); Unildison Alves Dias, São Paulo (BR); Celio Santos Pereira, Sao Paulo (BR); Gilberto Albertini, Sao Paulo (BR)

(73) Assignee: MANN+HUMMEL GmbH, Ludwigsburg (DE)

( * ) Notice: Subject to any disclaimer, the term of this patent is extended or adjusted under 35 U.S.C. 154(b) by 357 days.

(21) Appl. No.: 17/185,311

(22) Filed: Feb. 25, 2021

(65) Prior Publication Data
US 2021/0252437 A1 Aug. 19, 2021

Related U.S. Application Data

(63) Continuation of application No. PCT/EP2019/072711, filed on Aug. 26, 2019.

(60) Provisional application No. 62/724,201, filed on Aug. 29, 2018.

(51) Int. Cl.
| | | |
|---|---|---|
| *B01D 35/00* | (2006.01) |
| *F02M 37/34* | (2019.01) |
| *B01D 35/153* | (2006.01) |
| *B01D 35/26* | (2006.01) |
| *B01D 29/15* | (2006.01) |
| *B01D 36/00* | (2006.01) |

(52) U.S. Cl.
CPC .......... *B01D 35/005* (2013.01); *B01D 29/15* (2013.01); *B01D 35/153* (2013.01); *B01D 35/26* (2013.01); *F02M 37/34* (2019.01); *B01D 36/005* (2013.01); *B01D 2201/291* (2013.01); *B01D 2201/342* (2013.01); *B01D 2201/4061* (2013.01); *B01D 2201/4076* (2013.01); *B01D 2201/4084* (2013.01); *B01D 2201/4092* (2013.01)

(58) Field of Classification Search
CPC .... B01D 35/005; B01D 29/15; B01D 35/153; B01D 35/26; B01D 36/005; B01D 2201/291; B01D 2201/342; B01D 2201/4061; B01D 2201/4076; B01D 2201/4084; B01D 2201/4092; B01D 29/21; B01D 36/006; B01D 36/001; F02M 37/34
USPC ....... 210/117, 136, 450, 493.2, 416.1, 416.4, 210/429, 440–444, 455
See application file for complete search history.

(56) References Cited

U.S. PATENT DOCUMENTS

| | | |
|---|---|---|
| 4,551,071 A | 11/1985 | Ohgaki et al. |
| 2004/0026332 A1 | 2/2004 | Mouhebaty et al. |

(Continued)

FOREIGN PATENT DOCUMENTS

| | | |
|---|---|---|
| CN | 107905929 A | 4/2018 |
| DE | 3820675 A1 | 12/1989 |

(Continued)

*Primary Examiner* — Madeline Gonzalez

(57) ABSTRACT

Disclosed is a fuel pre-filter module for pre-filtering fuel for internal combustion engines, including but not limited to internal combustion engines for light trucks, buses, construction, and agricultural machines. Also disclosed is a filter element for use in the fuel pre-filter module.

7 Claims, 14 Drawing Sheets

(56) References Cited

U.S. PATENT DOCUMENTS

| | | | |
|---|---|---|---|
| 2006/0131225 A1* | 6/2006 | Luka | B01D 27/103 210/450 |
| 2009/0008322 A1 | 1/2009 | Sakraschinsky | |
| 2009/0057218 A1 | 3/2009 | Hanase et al. | |

FOREIGN PATENT DOCUMENTS

| | | |
|---|---|---|
| EP | 1671691 A1 | 6/2006 |
| JP | 2004136203 A | 5/2004 |

* cited by examiner

FUEL PRE-FILTER MODULE, FILTER ELEMENT AND FILTER HEAD WITH A PRIMING PUMP

CROSS-REFERENCE TO RELATED APPLICATIONS

This application is a bypass continuation application of international application No. PCT/EP2019/072711 having an international filing date of 26 Aug. 2019 and designating the United States, the international application claiming a priority date of 29 Aug. 2018 based on U.S. provisional patent application No. 62/724,201. The entire contents of the aforesaid international application and the aforesaid US provisional application being incorporated herein by reference to the fullest extent permitted by the law.

TECHNICAL FIELD

The present disclosure relates to the filtering of fuel delivered to an internal combustion engine. More particularly, the present disclosure relates to a fuel pre-filter module for filtering fuel to an internal combustion engine.

BACKGROUND

The statements in this section merely provide background information related to the present disclosure and may not constitute prior art.

Various systems are known for the filtering of fuel delivered to an internal combustion engine. For example, fuel-filtering systems may be used on various types of vehicles having internal combustion engines to filter the fuel of particulates and water prior to delivering the fuel to the internal combustion engine. One such fuel-filtering system is shown and described in commonly assigned U.S. Pat. No. 8,567,610. This system includes a type of fuel filter and water-separation device, a water-collecting chamber with a drain line, and a controllable water discharge valve. A cleaning component is disposed in the drain line behind the water discharge valve. A suction line connects a fuel tank with the fuel pump. Between the water-collecting chamber and cleaning component, a connecting line branches to the suction line, having a pressure controlled stop check valve.

While known fuel filter systems may work for their intended purposes, a continuous need for improvement in the relevant art remains.

SUMMARY

An object of the invention is to provide a fuel pre-filter module, filter element, and filter head for pre-filtering fuel delivered to an internal combustion engine of a motor vehicle, including but not limited to internal combustion engines for light trucks, buses, construction, and agricultural machines.

A further object of the invention is to provide a fuel pre-filter module, which provides for versatility in incorporating optional functions, such as a fuel heater, restriction sensor and other sensors, such as water sensors, into the fuel pre-filter module.

A further object of the invention is to provide a fuel pre-filter module in which a priming pump check valve may be incorporated into the exchangeable filter element, and replaced with the filter element. In this case, the check valve may be arranged at the end disk or plastic cover of the filter element.

A further object of the invention is to provide a fuel pre-filter module in which a priming pump check valves may be arranged in two or more stacked and coupled valve cage modules arranged in and coupled to the filter head. The check valves may be embodied as umbrella valves formed of an elastomeric material, for example: an elastomeric plastic, viton or a type of rubber material. Preferably, the stacked and coupled valve cage modules are detachable coupled or detachably fixed together and removable as a unit from the filter head, for service or replacement of individual valves or valve cage modules.

A further object of the invention is to provide a fuel pre-filter module in which the filter head includes a receptacle which may have axially extending ribs which engage a tubular protrusion of the filter element to enforce a correct axial positioning and optionally rotationally fix the filter element in the receptacle of the filter head.

A further object of the invention is to provide a fuel pre-filter module having two check valves in series, cooperating to enable operations of the hand pump.

A further object of the invention is to provide a fuel pre-filter module meeting environmental protection requirements by providing a cup assembly and connection system, capturing the fuel or oil trapped inside fuel pre-filter module and provide a drain valve or drain element for drainage of the captured fuel or oil before the filter element is removed.

A further object of the invention is to provide a fuel pre-filter module constructed substantially of plastic materials, which provides for reduced production cost and the efficient incorporation of optional functions, including but not limited to the optional functions discussed herein.

In accordance with one particular aspect, the present disclosure relates to a filter element including a filter medium, an upper end plate, and a first check valve. The filter medium is configured as a hollow filter medium body. The filter medium, in addition to filtration function, may preferably serve as a water separator to separate water from the fuel. Alternately, the filter medium may include a water separating layer arranged downstream of the filter medium. The upper end plate is arranged on an upper axial end of the hollow filter medium body and includes a central tubular projection arranged on an axially outer side of the upper end plate. A first valve seat is arranged within an interior of the tubular projection. The first check valve is arranged within the interior of the central tubular projection on the first valve seat and is adapted to allow fluid flow in a first direction and block fluid flow in an opposite second direction.

In accordance with another particular aspect, the present disclosure relates to a fuel pre-filter module for filtering fuel including a filter element and a filter head assembly. The filter head assembly comprises a filter head body having at least one fluid inflow port and at least one fluid outflow port. The filter element has a cylindrical filter medium and an upper end plate arranged on an upper axial end of the hollow filter medium body comprising a central opening. A first valve seat is arranged in the central opening. A first check valve is arranged on on the first valve seat and is adapted to allow fluid flow in a first direction and block fluid flow in an opposite second direction. Preferably, is adapted to allow fluid flow in a first direction from the inside to the outside of the hollow filter medium body, and block fluid flow in the opposite second direction. The upper end plate may have a central tubular projection arranged on an axially outer side of the upper end plate providing the central opening. The first valve seat may be arranged within an interior of the tubular projection. The first check valve may be arranged within the interior of the central tubular projection on the first valve seat. The filter head body comprises a receptacle formed on an inner side of the filter head body. The receptacle receives the filter element and is adapted to sealingly engage with the central opening to guide filtered fuel from the inside of the filter medium body to the filter head assembly. A second check valve preferably is provided in the filter head body adapted to allow fluid flow in a first direction and block fluid flow in an opposite second direction, wherein the second check valve is arranged in series and downstream relative to flow from the first check valve of the filter element, the first and second check valves acting together to allow fluid flow in the first direction and block fluid flow in the opposite second direction, and wherein the first and second check valves cooperate during operation of a priming hand pump assembly to pump fuel from at least one fluid inflow port of the fuel pre-filter module to fill a cup assembly and the filter element with fuel. The priming hand pump is comprised by the filter head assembly. Preferably, the priming hand pump is arranged downstream of the first check valve and upstream of the second check valve in the filter head. Preferably, the priming hand pump comprises a variable fluid volume which is configured to be repeatedly changed during manual hand pump operation.

In accordance with another particular aspect, the present disclosure relates to a fuel pre-filter module for filtering fuel including a filter element and a filter head assembly. The filter element has a cylindrical filter medium and an upper end plate arranged on an upper axial end of the hollow filter medium body. The upper end plate has a central tubular projection arranged on an axially outer side of the upper end plate. The filter head assembly includes a filter head body with a receptacle formed on an inner side of the filter head body. The receptacle receives the central tubular projection of the filter element into an interior of the receptacle. The receptacle includes a plurality of circumferentially spaced axially extending projection ribs formed on a radially inner surface of the receptacle. An axial end of the plurality of circumferentially spaced axially extending projection ribs may engage into axial grooves formed into a circumferential outer surface of the central tubular projection of the filter element to fix an axial position of the filter element relative to the filter head body and lock the rotational orientation of the filter element to the filter head body. In some aspects of the invention, the axially extending projection ribs may extend in the axial grooves of the central tubular projection to contact against a seal ring arranged in a seal groove in the circumferential outer surface of the central tubular projection.

In accordance with yet another particular aspect, the present disclosure relates to a fuel bleed system for a fuel pre-filter module, having a filter head assembly with a filter head body. The fuel bleed system includes a first cage element having a first cylindrical sidewall with a first plurality of sidewall openings and a first hollow interior. The first cage element further includes a first inwardly extending circumferential flange defining a first valve seat within the first hollow interior of the first cage element. The fuel bleed system further includes a first check valve for seating on the first valve seat. The first check valve is adapted to allow fluid flow in a first direction and block fluid flow in an opposite second direction. The fuel bleed system defines a preassembled subassembly insertable into a bore of the filter head body. The preassembled subassembly includes a first valve cage module that includes the first cage element and the first check valve, the first valve cage module removable from the filter head body as a unit. The fuel bleed system may additionally include an end cap for attachment of the fuel bleed system to the filter head body. The end cap is detachably coupled or detachably mounted to an upper end of the first cage element, preferably by elastic arms which engage into the first cage element.

In accordance with some aspects of the present disclosure, the first cage element and the second cage element are arranged in and mount to the filter head and are not arranged on the filter element. The first and second cage elements may be arranged in a tubular member forming a portion of the fuel bleed assembly of the filter head. The second cage element may project inwardly into an interior of the filter element though a central opening in the upper end plate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
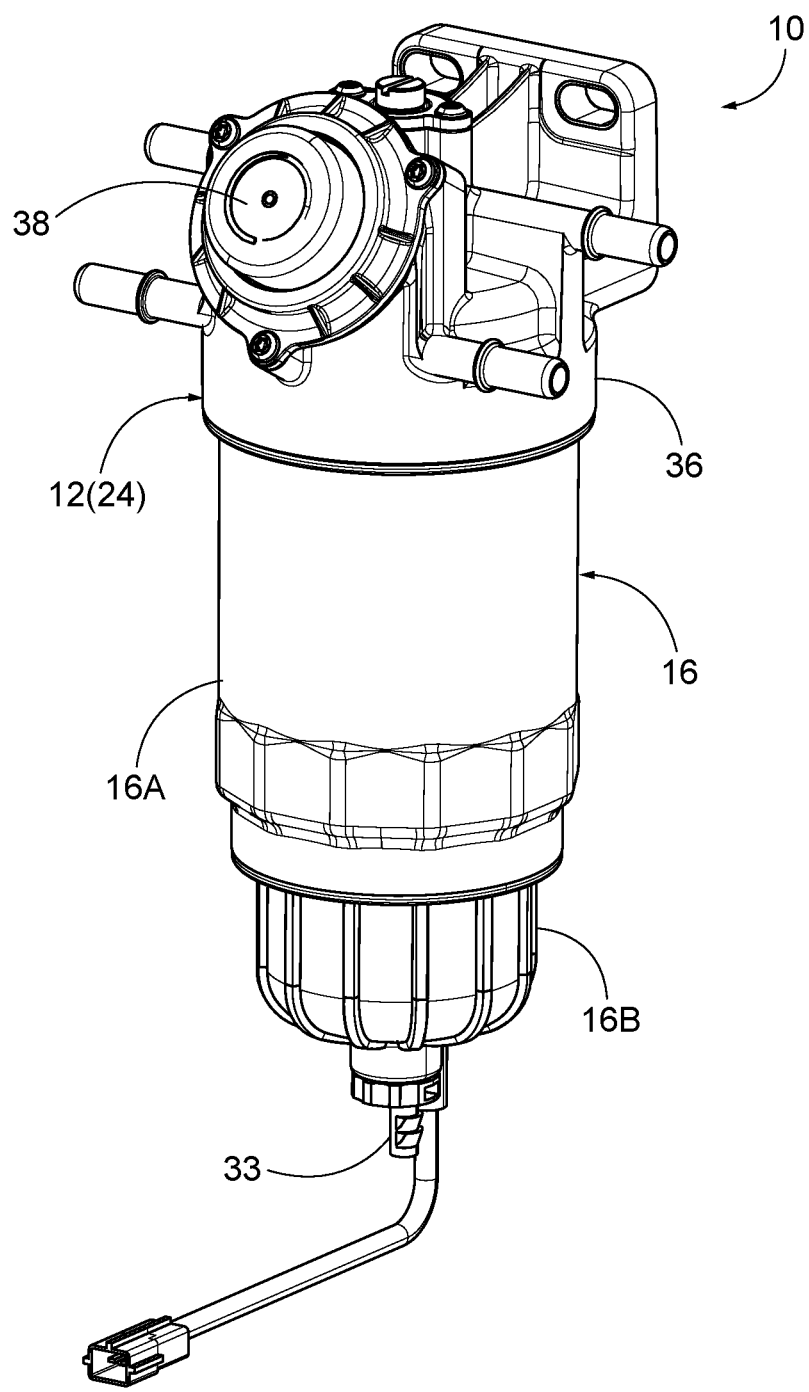
FIG. 1 is a perspective view of a fuel pre-filter module for pre-filtering fuel constructed in accordance with the present teachings.
Figure 2:
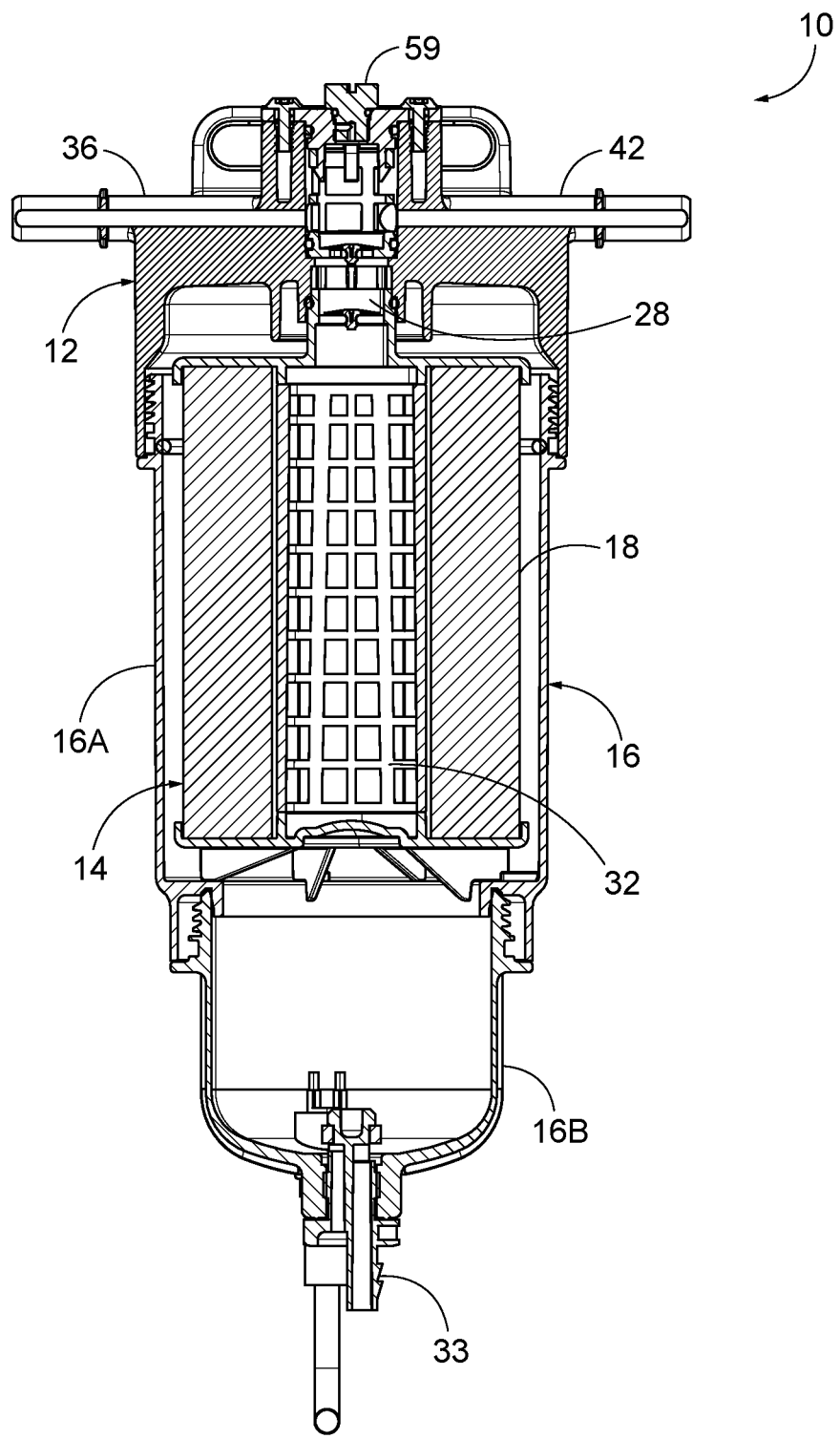
FIG. 2 is a longitudinal section of the fuel pre-filter module of FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The following description is merely exemplary in nature and is not intended to limit the present disclosure, application, or uses. It should be understood that throughout the drawings, corresponding reference numerals indicate like or corresponding parts and features. Before describing in detail embodiments that are in accordance with the present invention, it should be observed that the embodiments reside primarily in combinations of apparatus components related to fuel pre-filter module. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With initial reference to FIGS. 1 through 9 of the drawings, a pre-filter module in accordance with the present teachings is illustrated and generally identified at reference character 10. The fuel pre-filter module 10 may advantageously be part of a fuel system of an internal combustion engine. The fuel pre-filter module 10 may be used for cleaning fuel (i.e., filtering particulates and water from the fuel) which is supplied to the internal combustion engine. However, the invention is not limited to a fuel filter of a fuel system of an internal combustion engine of a motor vehicle. In this regard, it will be understood that the present teachings may be readily adapted for cleaning other types of liquids.

The pre-filter module 10 is shown to generally include a filter head assembly 12, a filter element 14, and a cup assembly 16.

The filter element 14 may be a hollow, cylindrical filter element 14 and may generally include a filter medium 18 which also functions as a water separator, removing water from the fuel, and may include upper and lower end plates 20 and 22. The filter medium 18, in addition to filtration function, may preferably also function as a water separator to separate water from the fuel. Optionally the filter medium 18 may further include a water separating layer arranged on a downstream side of the filter medium 18. The upper end plate 20 is arranged on an upper axial end of the filter medium 18 and the lower end plate 22 is arranged on a lower axial end of the filter medium 18. The filter medium may be arranged directly on a central support tube 32. The filter medium 18 may include filter paper, filter fleece, or some other filter medium that is suitable for filtering liquid. The filter medium 18 may have a single layer or multiple layers. The filter medium 18 may also be a multi-component filter medium having layers of differing filter media material, material properties, fiber types, diameters, and/or configurations. Preferably, the filter medium 18 is secured by adhesive or in any other manner well known in the art to the upper and lower end plates 20 and 22 of the hollow cylindrical filter element 14. More preferably, the upper and lower end plates 20 and 22 are constructed of plastic and the filter medium 18, plastic upper end plate 20, plastic lower end plate 22, and the central support tube 32 may be adhesively or thermally bonded together to form the filter element 14 as a unit.

The upper end plate 20 is shown to include a central tubular projection 24 arranged on an axially outer side of the upper end plate 20. The tubular projection 24 defines an opening in fluid communication with an interior of the filter element 14. An O-ring seal 26 is arranged on an outer surface of the central tubular projection 24. The central tubular projection 24 includes one of a plurality of axially extending grooves and a plurality of axially extending ribs formed into a radially outer surface of the central tubular projection 24. In the embodiment illustrated, the radially outer surface of the central tubular projection 24 is formed to include a plurality of axially extending grooves 27. As will be appreciated further below, these grooves 27 cooperate with corresponding structure of the filter head assembly 12 to radially orient the filter element 14 relative to the filter head assembly 12, to fix an axial position of the filter element 18 relative to the filter head assembly 12, and lock a rotational orientation of the filter element 18 to the filter head body. In this regard, the filter head assembly 12 includes the other of the axially extending ribs and axially extending grooves.

The pre-filter module 10 includes a valving system for controlling the flow of fuel. A first check valve 28 is arranged within the interior of the central tubular projection on a first valve seat 30, arranged within an interior of the tubular projection 24. In this manner, the first check valve 28 is incorporated into the filter element 14 and may be replaced with the filter element 14. The first check valve 28 may be a mushroom-type check valve (or umbrella-type valve) and is adapted to allow fluid flow in a first direction A and block fluid flow in an opposite, second direction B.

The cup assembly 16 may include a first or upper portion 16A and a second or lower portion 16B. The first portion 16A may be configured as a hollow cylinder defining an interior chamber into which the hollow cylindrical filter element 14 is received. The cup assembly 16 is detachably mounted to the filter head assembly 12 and may be detached to exchange or replace the hollow cylindrical filter element 14. The first portion 16A may be threadably coupled to the second portion 16B or otherwise releasably attached thereto. The second portion 16B may be in the form of a bowl. The second portion or bowl 16B may be transparent. A drain valve or drain screw 33 may be provided at the bottom of the second portion 16B for draining accumulated water from the second portion 16B. A gasket 35 may provide a fluid tight connection between the drain screw 33 and the second portion 16B. The cup assembly 16 provides for the capturing water separated from the fuel, and may also serve for drainage of the captured fuel or oil through the drain valve 33 before the filter element 18 is removed.

The cup assembly 16 may be removably attached to the filter head assembly 12 for replacement of the filter element 14. As shown in the drawings, the upper portion 16A of the cup assembly 16 may be threadably connected to the filter head body 36 of the filter head assembly 12. The upper end of the upper portion 16A may include external threads for engaging internal threads of the filter head body 36. An O-ring seal 39 is positioned between the upper portion 16A and the filter head body 36 to provide a fluid tight connection therebetween.

Figure 3:
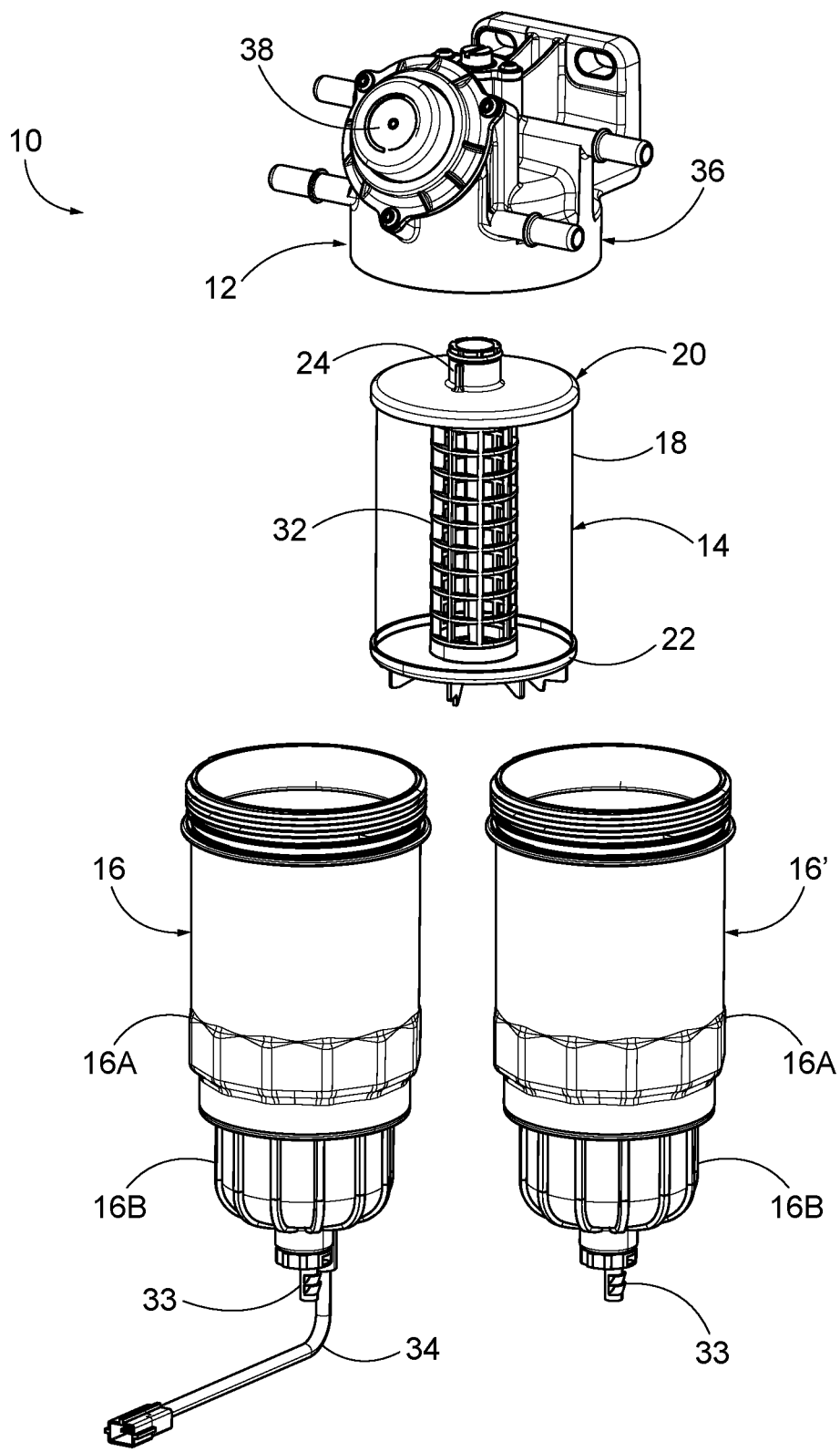
FIG. 3 is an exploded assembly view of the fuel pre-filter module of FIG. 1, showing the filter head assembly having a hand pump, the filter element, and two alternate configurations of a cup assembly.

As shown particularly in the exploded view of FIG. 3, the cup assembly 16 may optionally include a water-in-fuel sensor 34. The cup assembly 16 shown in FIG. 3 is provided with water-in-fuel sensor 34, and may be provided with or without the illustrated electrical leads. The cup assembly 16' is substantially identical to the cup assembly 16 without provision for accommodating the water-in-fuel sensor 34.

The filter head assembly 12 may generally include a filter head body 36, a priming hand pump assembly 38 and a fuel bleed system 40 used in filter priming. The filter head body 36 incorporates the components of the priming hand pump assembly 38 and the fuel bleed system 40. The filter head assembly 12 may be unitarily formed of a plastic material and may include at least one fluid inflow port 41, at least one fluid outflow port 42, and a receptacle 44 formed on an inner side of the filter head body 36. The receptacle 44 receives the central tubular projection 24 of the filter element 14 into an interior of the receptacle 44.

The receptacle 44 includes a plurality of circumferentially spaced axially extending projection ribs 46 formed on a radially inner surface of the receptacle 44. An axial end of the plurality of circumferentially spaced axially extending projection ribs 46 contacting the central tubular projection 24 of the filter element 14 to fix an axial position of the filter element 14 relative to the filter head body 36. The O-ring seal 26 of the tubular projection 24 provides a fluid tight seal between the central tubular projection 24 and the receptacle 44. In some aspects of the invention, the axially extending projection ribs 46 may extend radially into the axial grooves 27 formed into a circumferential outer surface of the central tubular projection 24, the ribs additionally may contact against the O-ring seal 26 arranged in a seal groove in the circumferential outer surface of the central tubular projection 24 to seal between the central tubular projection 24 and the receptacle 44.

The priming hand pump assembly 38 includes a manually depressed button or hand-operating button 48, a membrane 50, a membrane seat 52, a compression spring 54, and an end cap or plastic fixing ring 56. The hand-operating button 48 is inwardly pressed against a bias of the compression spring 54 to deflect the membrane 50. As will be discussed below, this deflection of the membrane 50 creates a pressure to prime the fuel. The priming hand pump assembly is secured to the filter head body 36 by the end cap 56. A plurality of screws 58 may be used to engage the filter head body 36.

The fuel bleed system 40 generally includes a bleed screw 59 and a second check valve 60. As with the first check valve 28, the second check valve 60 may be a mushroom-type or umbrella-type valve. It will be understood; however, that any type of check valve may be alternatively substituted for the first check valve 28 or second check valve 60. In its closed positon, the second check valve 60 is seated on a second valve seat 62. In the embodiment illustrated, the fuel bleed system 40 further includes a cage element 63 defining the second valve seat 62. The cage element 63 may be a hollow cylindrical member with a plurality of openings in the cylindrical sidewall thereof. At a lower end, the cage element 63 includes an inwardly extending flange defining the second valve seat 62. The cage element 63 and the check valve 60 cooperate to define a valve cage module removable from the filter head body as a unit for service or replacement of the cage element 63, check valve 60 or both.

A first O-ring seal 68 of the fuel bleed system 40 is carried at a lower end of the cage element 63 and provides a fluid seal between the cage element 63 and the filter head body 36. A second fixing ring or end cap 64 may be used to secure the fuel bleed system 40 to the filter head body 36 with a plurality of fasteners 66. A second O-ring seal 70 of the fuel bleed system 40 is carried at an underside of the second plastic ring 64 and provides a fluid seal between the second plastic ring 64 and the cage element 63. A third O-ring 72 of the fuel bleed system 40 provides a fluid seal between the bleed screw 59 and the second plastic ring 64.

In the embodiment illustrated, the end cap 64 of the fuel bleed system 40 may be coupled to the cage element 63. For example, the end cap 64 is detachably coupled or detachably mounted to the cage element 63. Preferably, the end cap 64 may be snap-fit to the cage element 63. In this regard, the end cap 64 may include retention elements in the form of axially extending arms 74. The axially extending arms 74 may be elastic arms resiliently deflected in a radial direction to engage the cage element 63 in a snap-fit relationship. Describing this feature further, the cage element 63 includes an upper ring 65. The arms 74 of the end cap 64 axially extend into the central opening of the cage element 63. When the arms 74 are advanced into the opening, the distal ends of the arms 74 are inwardly deflected. The distal ends are hook shaped. When these distal ends axially pass the upper ring 65 of the cage element 63, the distal ends radially snap outward under an inherent bias and extend into opening of the sidewall of the cage element 63. The hooked distal ends of the arms 74 prevent the end cap 64 from inadvertent separation from the cage element 63.

The fuel bleed system 40 defines, in this manner, a subassembly that may be preassembled as a unit and inserted as a unit within a bore defined by the fuel head body 36. The fuel bleed subassembly may include the bleed screw 59, the end cap 64, the cage element 63 defining the valve seat 62, the check valve 60, and the O-rings 68, 70, and 72.

As will be described further below, the second check valve 60 is adapted to allow fluid flow in the first direction A (see FIG. 6D, for example) and block fluid flow in the opposite, second direction B. The second check valve 60 is arranged in series and downstream relative to flow from the first check valve 28 of the filter element 14, the first and second check valves 28 and 60 cooperate with one another to allow fluid flow in the first direction A and block fluid flow in the opposite, second direction B.

The bleed screw 59 may be opened during initial priming of the fuel pre-filter module 10 using the priming hand pump assembly 38. The filter head assembly 12 also may include a mounting flange 76 having mounting holes 78 with compression limiters 80 installed therein.

Through manual operation of the priming hand pump assembly 38, the fuel available in the supply line delivered into the interior of the fuel pre-filter module 10. The manual operation of the pump is repeated until total filling of the interior of the filter element 14 with fuel is completed. Completion may be determined when fuel is seen flowing from the bleed screw 59. The bleed screw is then closed to prepare for normal operation. The normal flow path and the cooperation of the check valves 28 and 60 for the operation of the priming hand pump assembly 38 is perhaps best seen with reference to the cross-sectional view of FIG. 5B. The first and second check valves 28 and 60 cooperate during operation of the priming hand pump assembly 38 to pump fuel from the at least one fluid inflow port 41 to fill the cup assembly 16 and filter element 14 with fuel.

Before priming the filter element 14, the bleed screw 59 is rotated open. As shown in FIG. 5B, for initial filling of fuel into the filter element 14, the hand-operating button 48 of the priming hand pump assembly 38 can be depressed inwardly into the filter head body 36. Depressing the hand-operating button 48 shrinks the size of a pump chamber 82 by deflecting the membrane 50 inwardly, resulting in a pressure increase in the pump chamber 82. The increased pressure opens the second check valve 60 of the filter head assembly 12. The compression spring 54 then urges the hand-operating button 48 outwardly to its rest position, thereby enlarging the pump chamber 82 by deflecting the membrane 50 outwardly, causing a vacuum pressure in the pump chamber 82. The vacuum pressure is communicated from the pump chamber 82, through a pump channel 86 to a region between the check valves 28 and 60. The vacuum closes the second check valve 60 and opens first check valve 28. The vacuum at the interior chamber of the filter element 14 is communicated through the filter medium 18 and to the fluid inflow port 41, acting to draw fuel or fuel oil from a fuel supply into the fuel pre-filter module 10 to fill the interior chamber and the filter element 14. Hand pump operation is repeated, filling the filter element 14 and cup assembly 16 until fuel is observed to flow out of the bleed screw 59, indicating the priming is complete. In hand pump priming, fuel enters along inlet flow path 90, flows through the filter medium 18, along a filter flow path 92, flows upwardly through the filter element first check valve 28, into a chamber 94, between the check valves 28, 60. The vacuum pulls the fuel into the pump chamber 82. The hand-operating button 48 is depressed inwardly causing a pressure in the pump chamber 82, urging the fuel out of the pump chamber 82 and into the chamber 94 between the check valves 28 and 60. The pressure urges the filter head check valve 60 to open, so fuel can flow to and be visible at the bleed screw 59 along a vent flow path 96. The bleed screw 59 is then closed.

In normal operation, the fuel enters the fluid inflow port 41, flows along inlet flow path 90, through the filter medium 18 in the filter element interior. Flow then continues through the upper end plate 20, and tubular projection 24 of the upper end plate 20, through the filter element check valve 28, into the chamber 94 between the check valves 28 and 60, continues through the filter head check valve 60, and exits the fuel pre-filter module 10 through the fluid outflow port 42 along a filter fluid outlet path 98.

Figure 5:
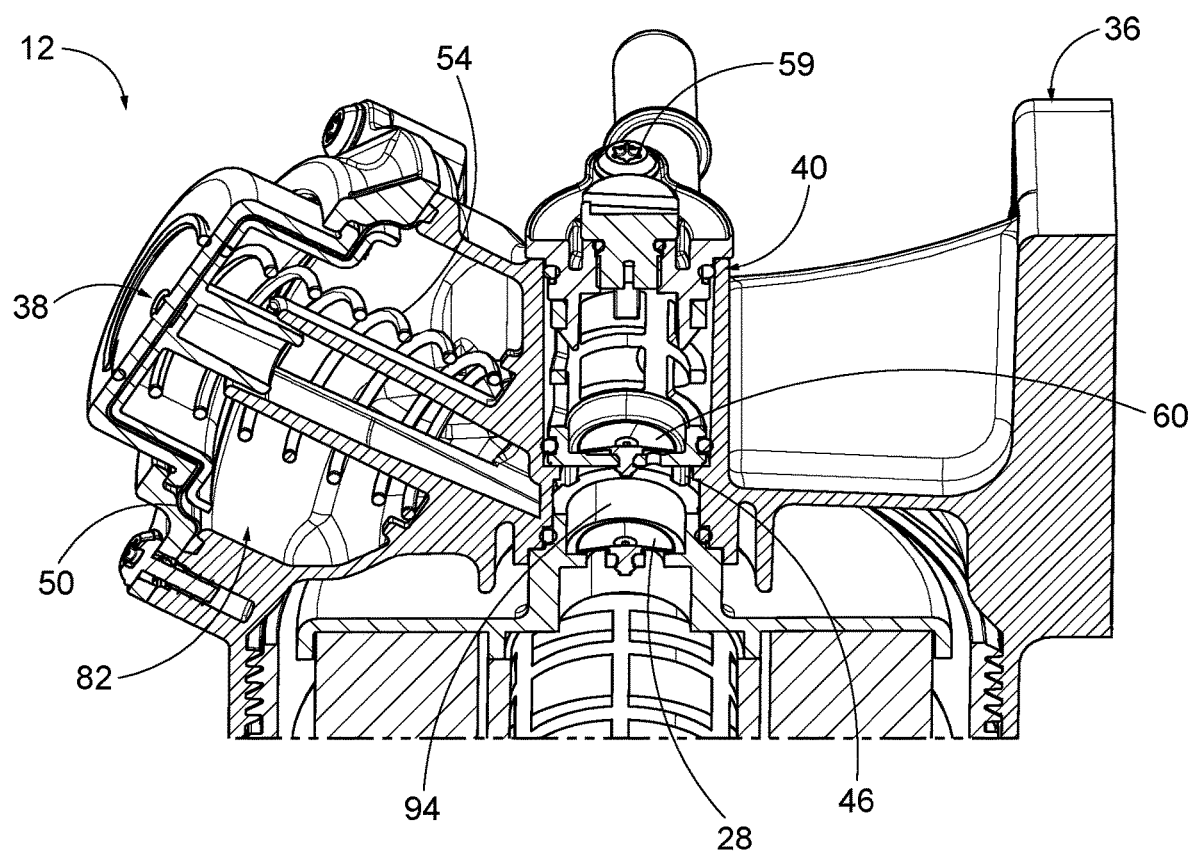
FIG. 5 is a cross-sectional view of a portion of the fuel pre-filter module of FIG. 1, further illustrating the filter head assembly hand pump, the fuel bleed system, the filter element at the upper end plate, and particularly the arrangement of check valves providing one-way flow of fuel.
Figure 5B:
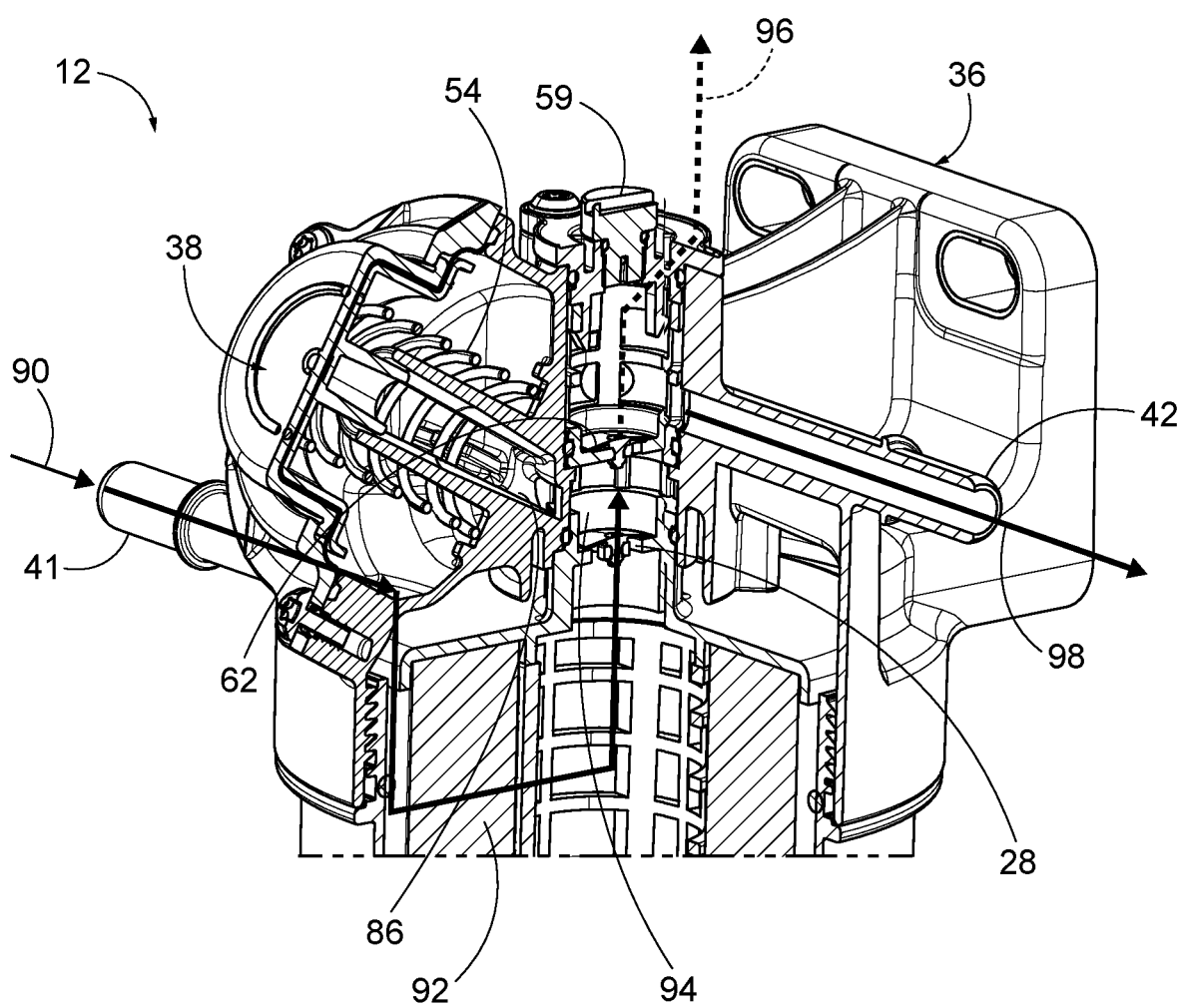
FIG. 5B is another cross-sectional view of a portion of the fuel pre-filter module of FIG. 1, further illustrating the filter head assembly hand pump, the fuel bleed system, the filter element at the upper end plate, and particularly the cooperation of the check valves for operation of the hand pump.
Figure 6A:
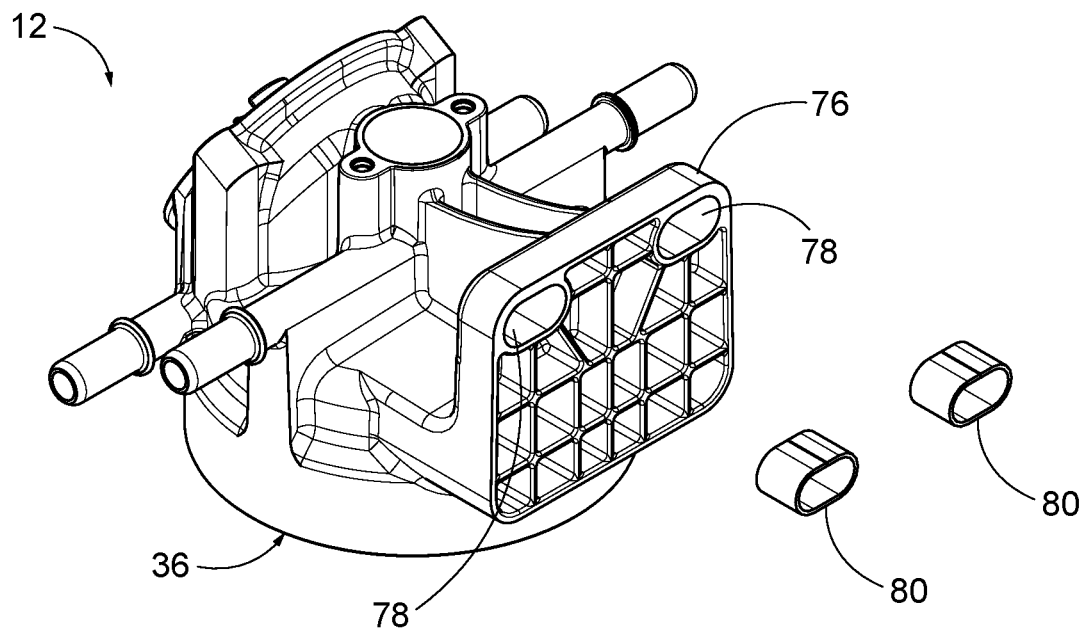
FIG. 6A is a perspective view of the filter head body with hand pump and fuel bleed system removed for purposes of illustration.
Figure 6B:
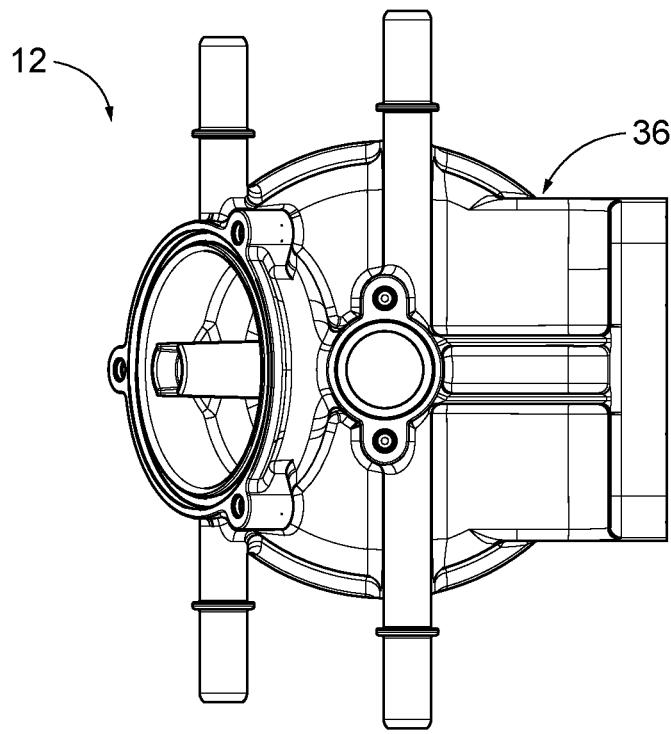
FIG. 6B is a top view of the filter head body of FIG. 6A.
Figure 6C:
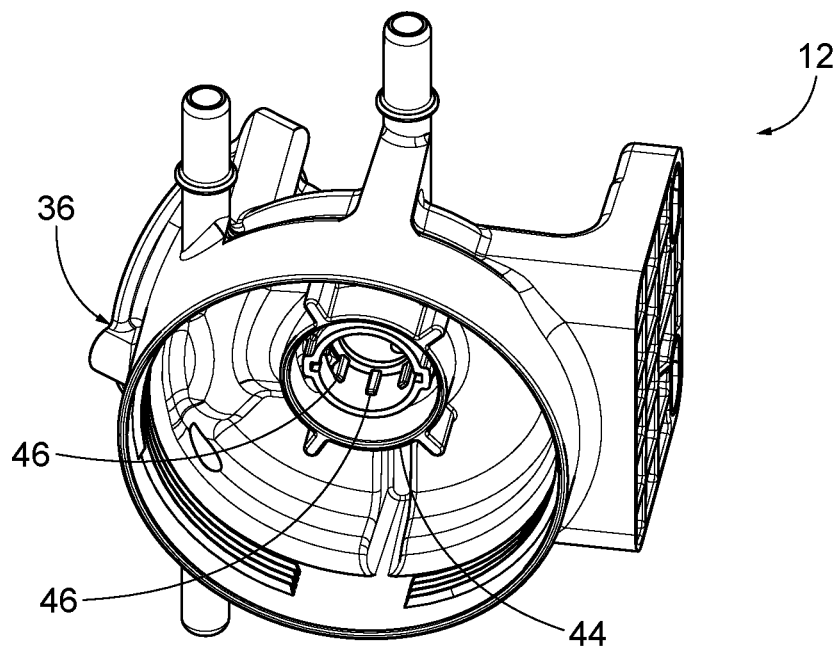
FIG. 6C is a bottom perspective view of the filter head body of FIG. 6A.
Figure 6D:
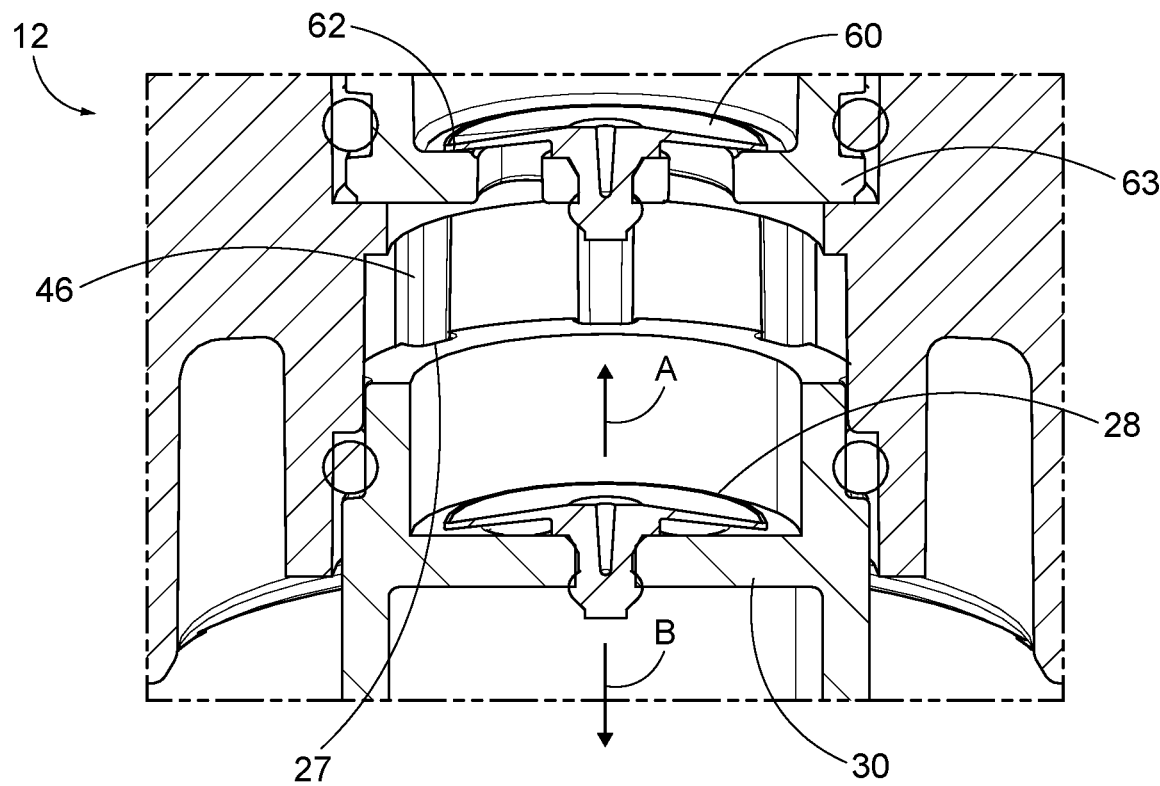
FIG. 6D shows a longitudinal section of a portion of the filter element, illustrating an interface between the upper end plate of the filter element and the socket and internal ribs of the filter head body, as well as the check valve provided in the filter element.
Figure 7A:
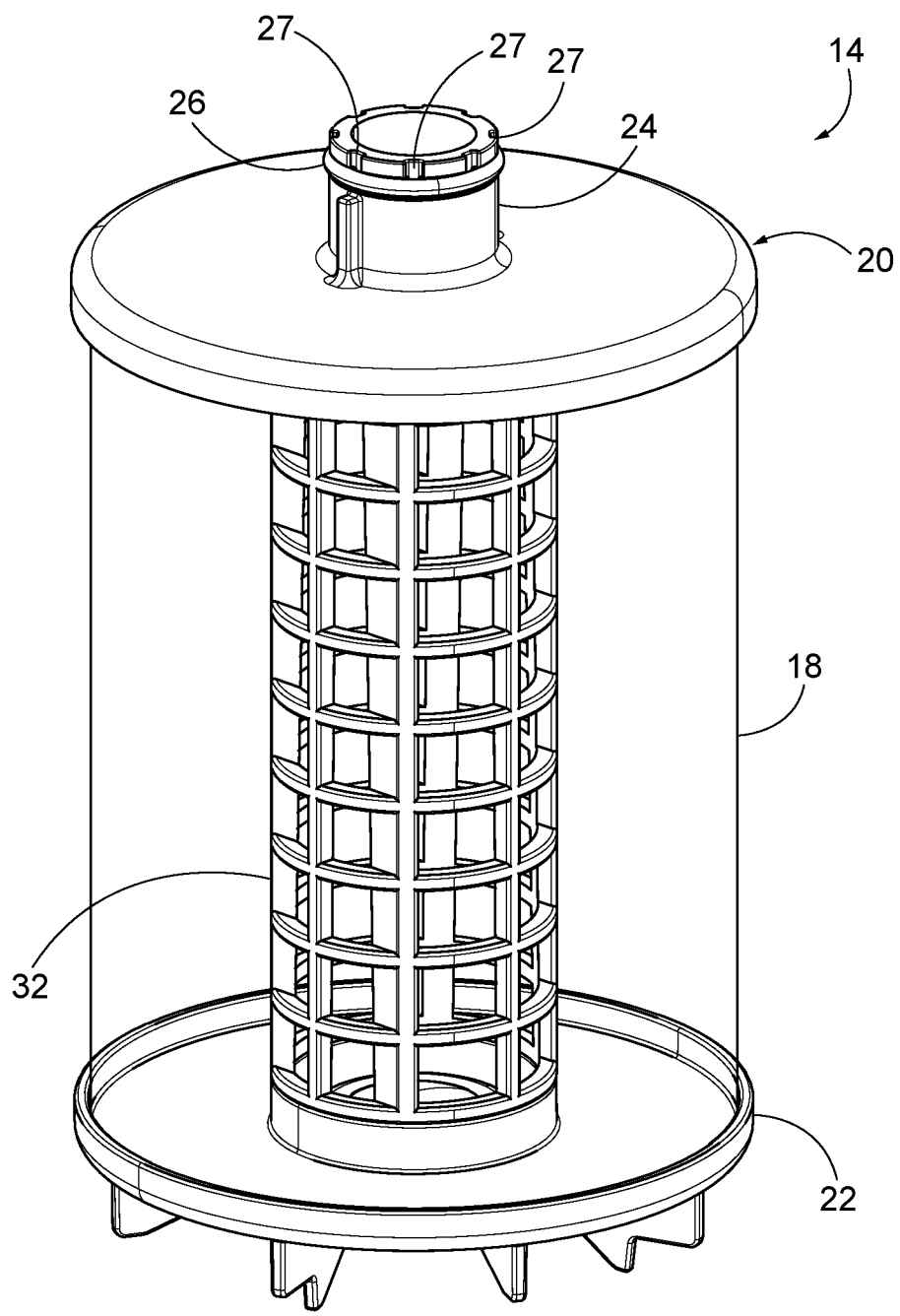
FIG. 7A is a perspective view of the filter element, the filter medium shown in simplified form for purposes of better illustrating internal details of the filter element.
Figure 7B:
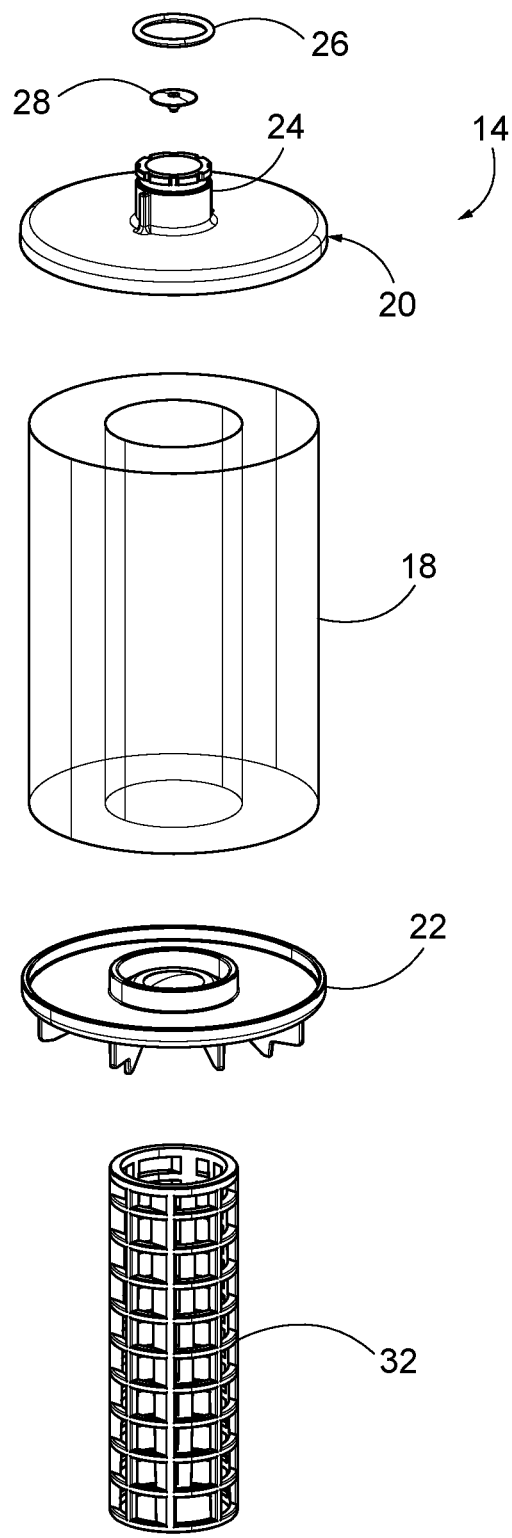
FIG. 7B shows an exploded view of the filter element of FIG. 7A.
Figure 8:
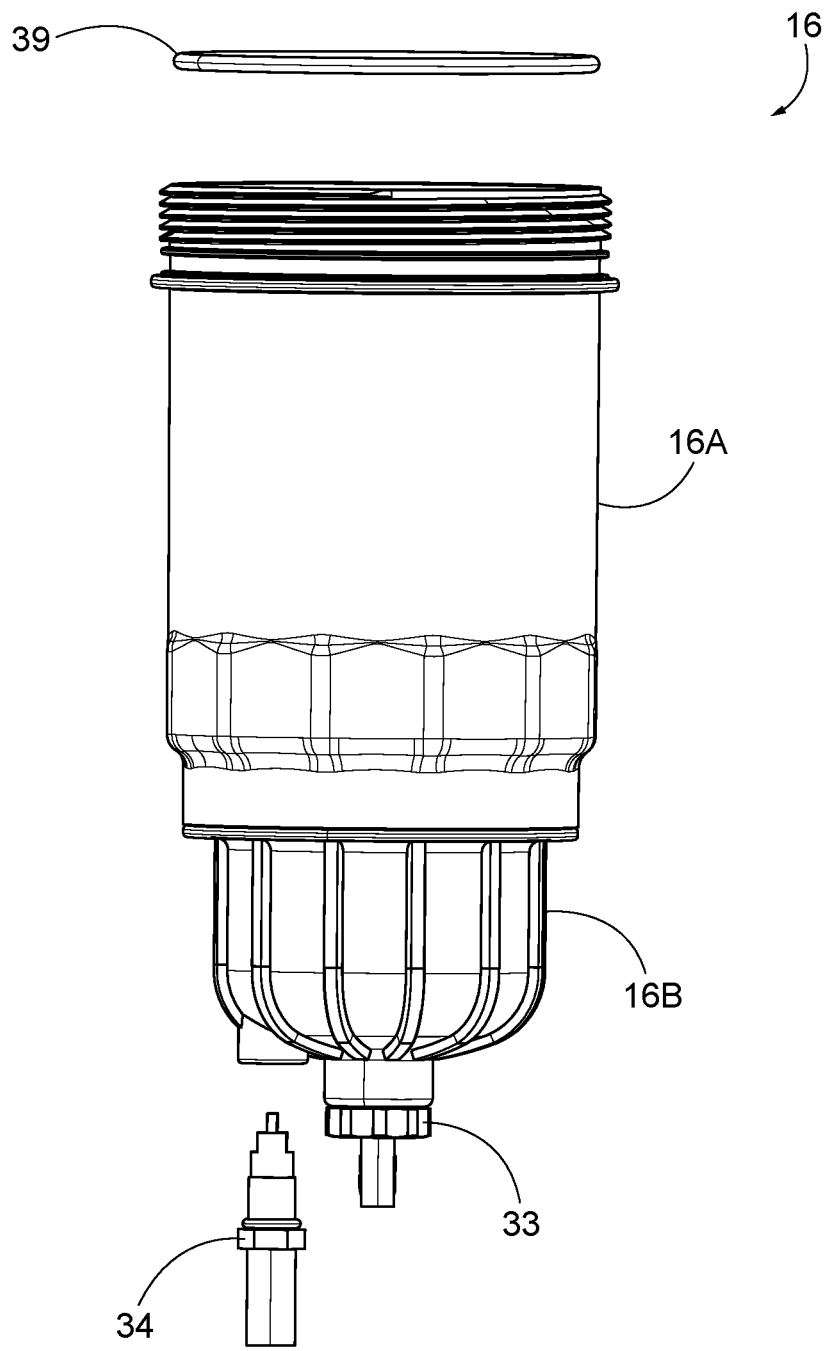
FIG. 8 is an exploded side view of the cup assembly of the fuel pre-filter module of the present teachings.
Figure 9:
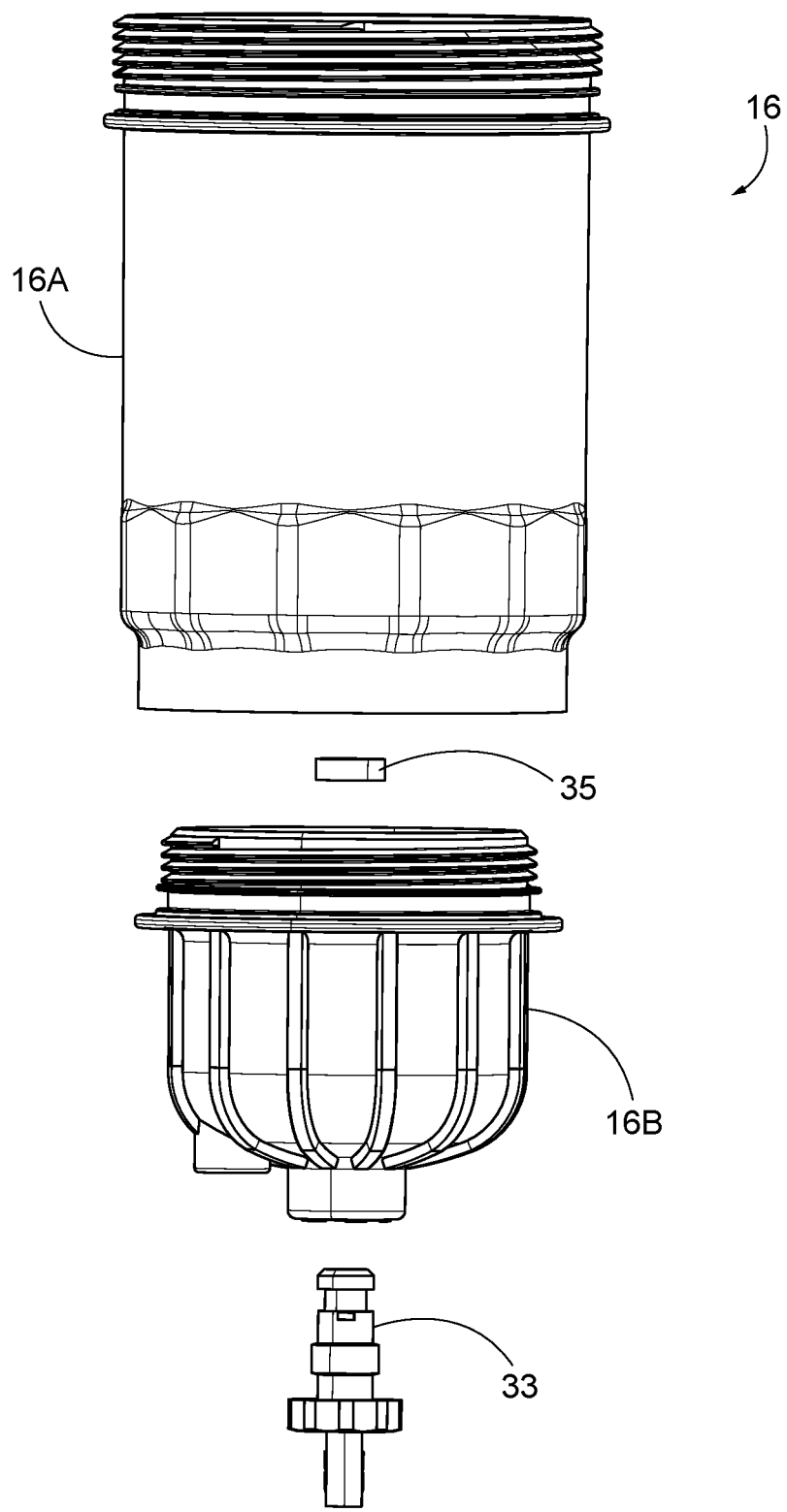
FIG. 9 is an exploded view of the cup assembly of the fuel pre-filter module of the present teachings, particularly showing the transparent bowl and drain screw.
Figure 10:
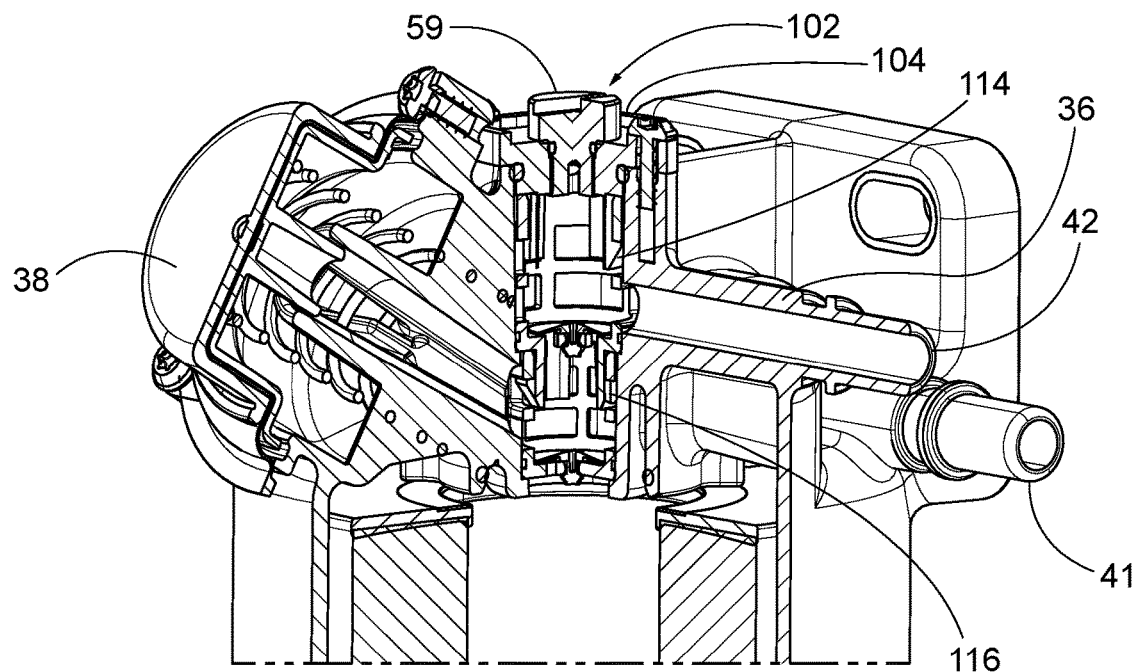
FIG. 10 is a perspective, cross-sectional view of a portion of another of the fuel pre-filter module constructed in accordance with the present teachings.
Figure 11:
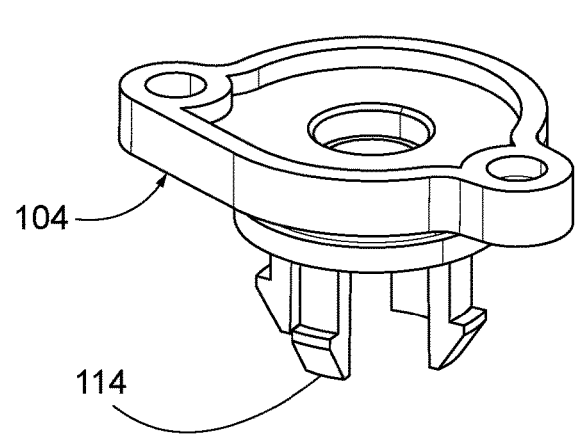
FIG. 11 is a perspective view of an end cap of a fuel bleed system of the fuel pre-filter module of FIG. 10.
Figure 12:
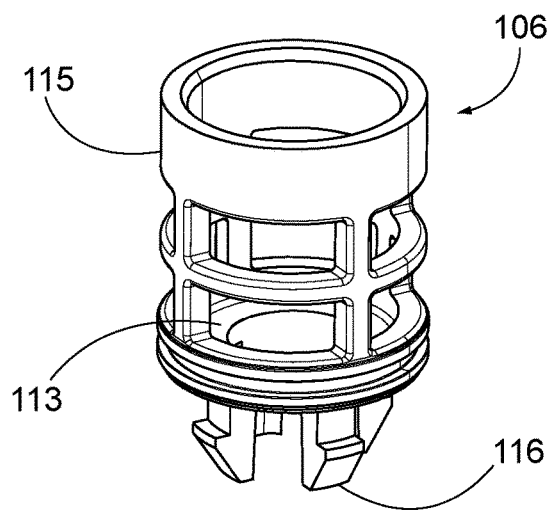
FIG. 12 is a perspective view of a cage element of the fuel bleed system of the fuel pre-filter module of FIG. 10.
Figures 13A, 13B, 13C:
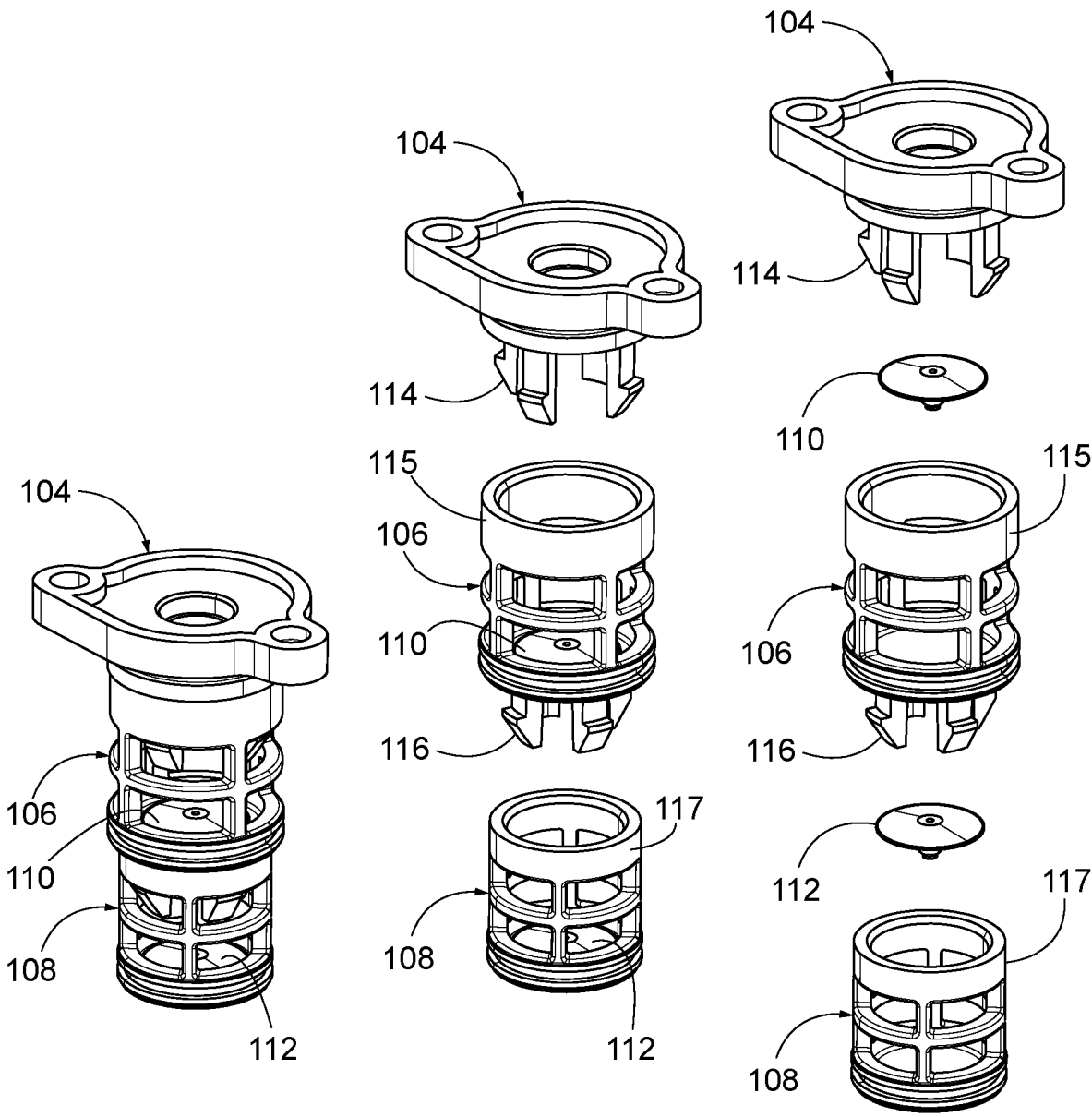
FIG. 13A is a perspective view of assembled components of the fuel bleed system of the fuel pre-filter module of FIG. 10, the components coupled together to define a subassembly.
FIG. 13B is an exploded perspective view of the components of the fuel bleed system of FIG. 13A.
FIG. 13C is another exploded, perspective view of the components of the fuel bleed system of FIG. 13A.

As can be seen in the cross-sectional views of FIGS. 5, 5B, and 6D, for example, the internal ribs 46 of the receptacle 44 enforce a fixed axial spacing of the filter element 14 relative to the filter head body 36. The fixed axial spacing ensures proper, non-blocking positioning of the tubular projection 24 in the receptacle 44, so that the pump channel 86 has a clear path into the chamber 94 between the check valves 28 and 60. The tubular projection 24 of the filter element end plate 28 has an O-ring seal 26 of an elastomer. The O-ring seal 26 is arranged on the outer surface of the tubular projection 24 and is optionally held in a circumferential groove. The internal ribs 46 may contact the upper axial end of the tubular projection 24, may alternately contact against the O-ring seal 26, or contact an axial end of the tubular projection 24 to fix the axial position.

As can be seen in FIGS. 5 and 6D, for example, the plurality of axially extending grooves 27 of the tubular projection 24 align to receive and engage a portion of the internal ribs 46 of the receptacle 44. In this case, the internal ribs 46 may be received into respective axial grooves 27 formed on the outer surface of the tubular projection 24. The internal ribs 46 engaging down into the axial grooves 27 until they hit an axial bottom of the groove 27. The internal ribs 46 may preferably contact and engage against the O-ring 26. The internal ribs 46 in the axial grooves 27 advantageously fix a rotational position of the filter element 14 relative to the filter head body 36, and fix the axial position of the fixed axial spacing discussed for the pump operation.

FIG. 6A shows a perspective view of the filter head body 36 with the components of the priming hand pump assembly 38 and the fuel bleed system 40 removed. FIG. 6B shows a top view of the filter head body 36 of FIG. 6A. FIG. 6C shows a bottom view of the filter head body 36 of FIG. 6A. FIG. 6D shows a longitudinal section of the interface between the upper end plate 20 of the filter element 14 and the receptacle 44 and axially elongated radially inwardly projecting internal ribs 46, as well as a filter element mushroom valve (check valve) 28 provided in an interior of a tubular projection 24 at the upper end plate 20 of the filter element 14. The tubular projection 24 is received into the receptacle 44 until engaging against axial ends of the internal ribs 46, ensuring the correct mounting position of the filter element relative to components of the filter head assembly 12.

Turning to FIGS. 10 through 13C of the drawings, a variant of the pre-filter module in accordance with the present teachings is illustrated and generally identified at reference character 100. In view of the similarities between various elements of the pre-filter module 10 and the pre-filter module 100, like reference numbers have been used to identify substantially identical elements. The description with regard to the pre-filter module 100 will be primarily directed to additional and/or different features. Details not specifically described with regard to the pre-filter module 100 will be understood to be consistent with corresponding details of the pre-filter module 10 to any extent such details are not inconsistent.

The pre-filter module 100 differs primarily from the pre-filter module 10 by incorporating an alternative fuel bleed system 102. The fuel bleed system 102 includes an end cap 104, a first cage element 106, a second cage element 108, a first check valve 110, and a second check valve 112. The first check valve 110 will be understood to be similar in construction and function to the second check valve 60 of the module 10 and the second check valve 112 will be understood to be similar to the first check valve 28 of the module 10.

Similar to the cage element 63 of the module 10, the first cage element 106 may be a hollow cylindrical member with a plurality of openings in a sidewall thereof. At a lower end thereof, the first cage element 106 includes an inwardly extending flange 113 defining a first valve seat for the first check valve 110. The first cage element 106 and the first check valve 110 cooperate to define a first valve cage module. The second cage element 108 may similarly be a hollow cylindrical member with a plurality of openings in a sidewall thereof. At a lower end thereof, the second cage element 108 includes an inwardly extending flange defining a second valve seat for the second check valve 112. The second cage element 108 and the second check valve 112 cooperate to define a second valve cage module. The first and second valve cage modules may preferably be stacked and detachable coupled or detachable fixed together and removable as a unit for the service or replacement of individual check valves or valve cage modules.

Figure 4:
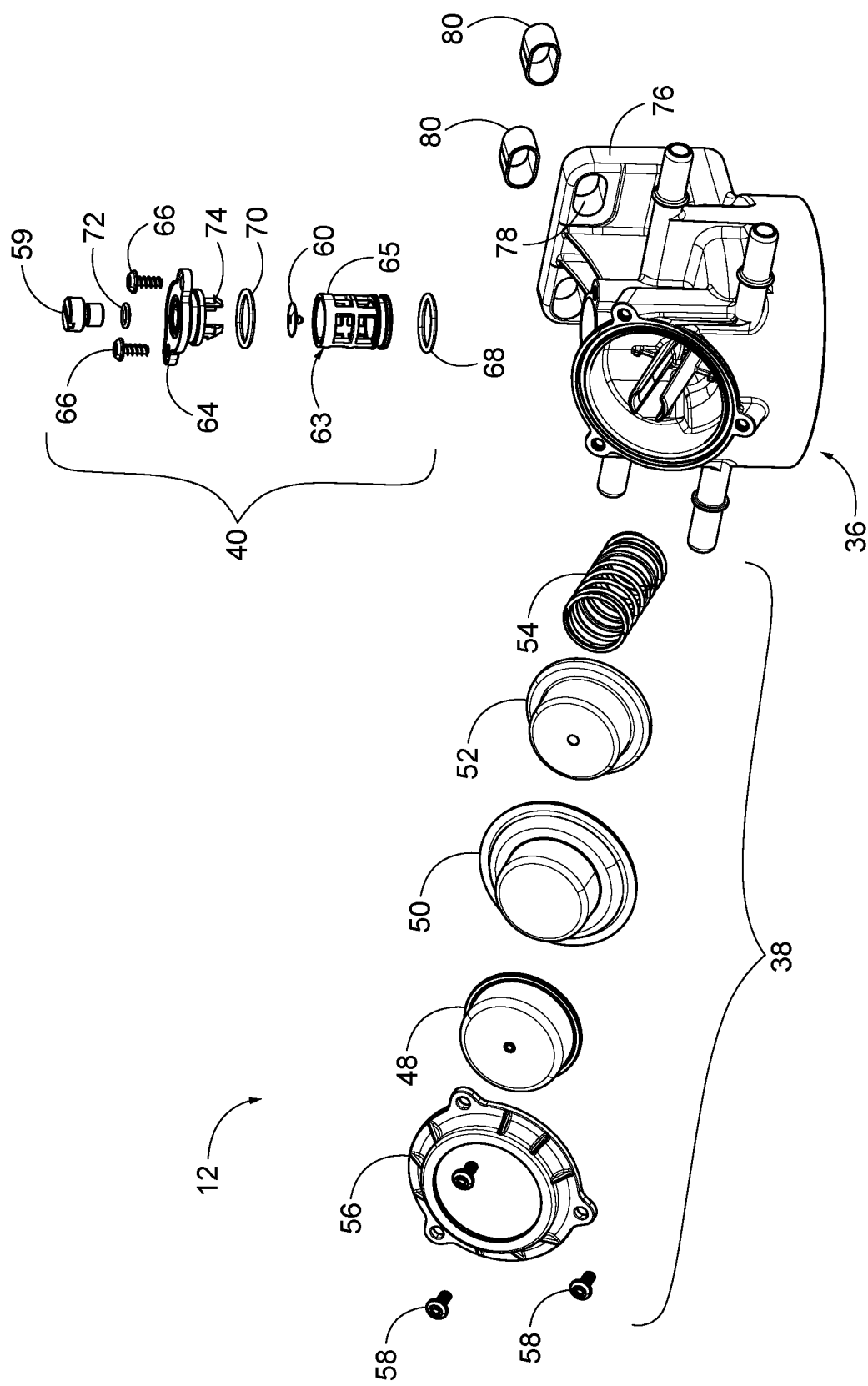
FIG. 4 is an exploded assembly view of the filter head assembly, further illustrating details of the priming hand pump and the fuel bleed system used in filter priming.

The end cap 104 may be secured to the filter head body 36 with a plurality of fasteners (as shown in FIG. 4, for example). The end cap 104 is coupled to the first cage element 106 and the first cage element 106 is coupled to the second cage element 108. Preferably, the end cap 104 may be snap-fit to an upper end of the first cage element 106 and the lower end of the first cage element 106 may be snap-fit to an upper end of the second cage element 108. The end cap 104 may include a first plurality of axially extending arms 114 substantially identical in construction and function to the arms 74 and the end cap 64. These arms 114 engage an underside of an upper ring 115 of the cage element 106. The lower end of the first cage element 106 includes a substantively identical second plurality of arms that engage an upper ring of the second cage element 108.

As with the fuel bleed system 40, the fuel bleed system 102 defines a preassembled subassembly insertable into a bore of the filter head body as a unit. In the fuel bleed system 102, the preassembled subassembly includes the first and second cage elements 106 and 108, the first and second check valves 110 and 112, the end cap 104 and the bleed valve 59. The subassembly may also include the O-rings (shown in connection with the fuel bleed system 40). As illustrated, the first and second cage elements 106 and 108 are arranged in a tubular member forming a pump portion of the fuel bleed system 102. The cage elements 106 and 108 are not arranged on the filter element 18. The second cage element 108, however, projects inwardly into an interior of the filter element 18 through a central opening of the upper end plate 20 of the filter element 18.

While various embodiments have been described, those skilled in the art will recognize modifications or variations, which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A fuel pre-filter module for filtering fuel comprising:
 a filter element comprising:
  a filter medium configured as a hollow filter medium body;
  an upper end plate arranged on an upper axial end of the hollow filter medium body, the upper end plate having a central tubular projection arranged on an axially outer side of the upper end plate;
  a first valve seat arranged within an interior of the central tubular projection; and
  a first check valve arranged within the interior of the central tubular projection on the first valve seat and adapted to allow fluid flow in a first direction and block fluid flow in an opposite second direction;
 a filter head assembly having:
  a filter head body having:
   at least one fluid inflow port;
   at least one fluid outflow port; and
   a receptacle formed on an inner side of the filter head body, the receptacle receiving the central tubular projection of the filter element into an interior of the receptacle, the receptacle having:
    a plurality of circumferentially spaced axially extending projection ribs formed on a radially inner surface of the receptacle, an axial end of the plurality of circumferentially spaced axially extending projection ribs contacting the central tubular projection of the filter element to fix an axial position of the filter element relative to the filter head body.

2. The fuel pre-filter module for filtering fuel of claim 1, further comprising a priming hand pump assembly carried by the filter head body.

3. The fuel pre-filter module for filtering fuel of claim 1, further comprising a fuel bleed system, the fuel bleed system including:
 a bleed screw;
 a second valve seat; and
 a second check valve adapted to allow fluid flow in a first direction and block fluid flow in an opposite second direction,
 wherein the second check valve is arranged in series and downstream relative to flow from the first check valve of the filter element, the first and second check valves acting together to allow fluid flow in the first direction and block fluid flow in the opposite second direction, and
 wherein the first and second check valves cooperate during operation of a priming hand pump assembly to pump fuel from at least one fluid inflow port of the fuel pre-filter module to fill a cup assembly and the filter element with fuel.

4. The fuel pre-filter module for filtering fuel of claim 1, further comprising a cup assembly threadably connected to a filter head assembly, the cup assembly including:
 a substantially tubular outer wall having a first end threadably connected to the filter head assembly and circumferentially enclosing a chamber, the chamber receiving the filter element.

5. The fuel pre-filter module according to claim 1, wherein:
 an O-ring seal is arranged in a circumferential groove formed in a radially outer surface of the central tubular projection; and
 the axially extending projection ribs extend to and contact the O-ring seal.

6. The fuel pre-filter module according to claim 3, wherein the fuel bleed system further includes a cage element having a hollow, cylindrical shape, the second valve seat defined by the cage element proximate a lower end thereof.

7. The fuel pre-filter module according to claim 1, wherein the central tubular projection includes a plurality of axially extending grooves formed into a radially outer surface of the central tubular projection.

* * * * *